United States Patent [19]

Loup

[11] 4,353,394

[45] Oct. 12, 1982

[54] SOLENOID OPERATED DIRECTIONAL VALVE WITH DETENT MECHANISM

[75] Inventor: Ronald L. Loup, Clarkston, Mich.

[73] Assignee: Double A Products Co., Manchester, Mich.

[21] Appl. No.: 239,056

[22] Filed: Feb. 27, 1981

[51] Int. Cl.³ .......................................... F15B 13/044
[52] U.S. Cl. ............................. 137/625.65; 251/137; 251/297; 335/253
[58] Field of Search ................... 137/625.65; 251/137, 251/297; 335/253

[56] References Cited

U.S. PATENT DOCUMENTS 4,185,661  1/1980  Gill et al. ...................... 137/625.65

FOREIGN PATENT DOCUMENTS 56-10874  2/1981  Japan ............................. 137/625.65

Primary Examiner—Gerald A. Michalsky
Attorney, Agent, or Firm—Stephenson and Boller

[57] ABSTRACT

A solenoid operated directional valve 10 with detent means 48, 50 for retaining the spool 38 of the valve in selected positions, the detent means being operatively associated with the solenoid pins 44, 46 for holding one or the other of the pins in a selected position for retaining the spool in a selected position, said detent means being constructed and arranged to provide detent disengagement forces of uniform magnitude and having components that can be manufactured at relatively low cost.

9 Claims, 4 Drawing Figures

U.S. Patent  Oct. 12, 1982  4,353,394
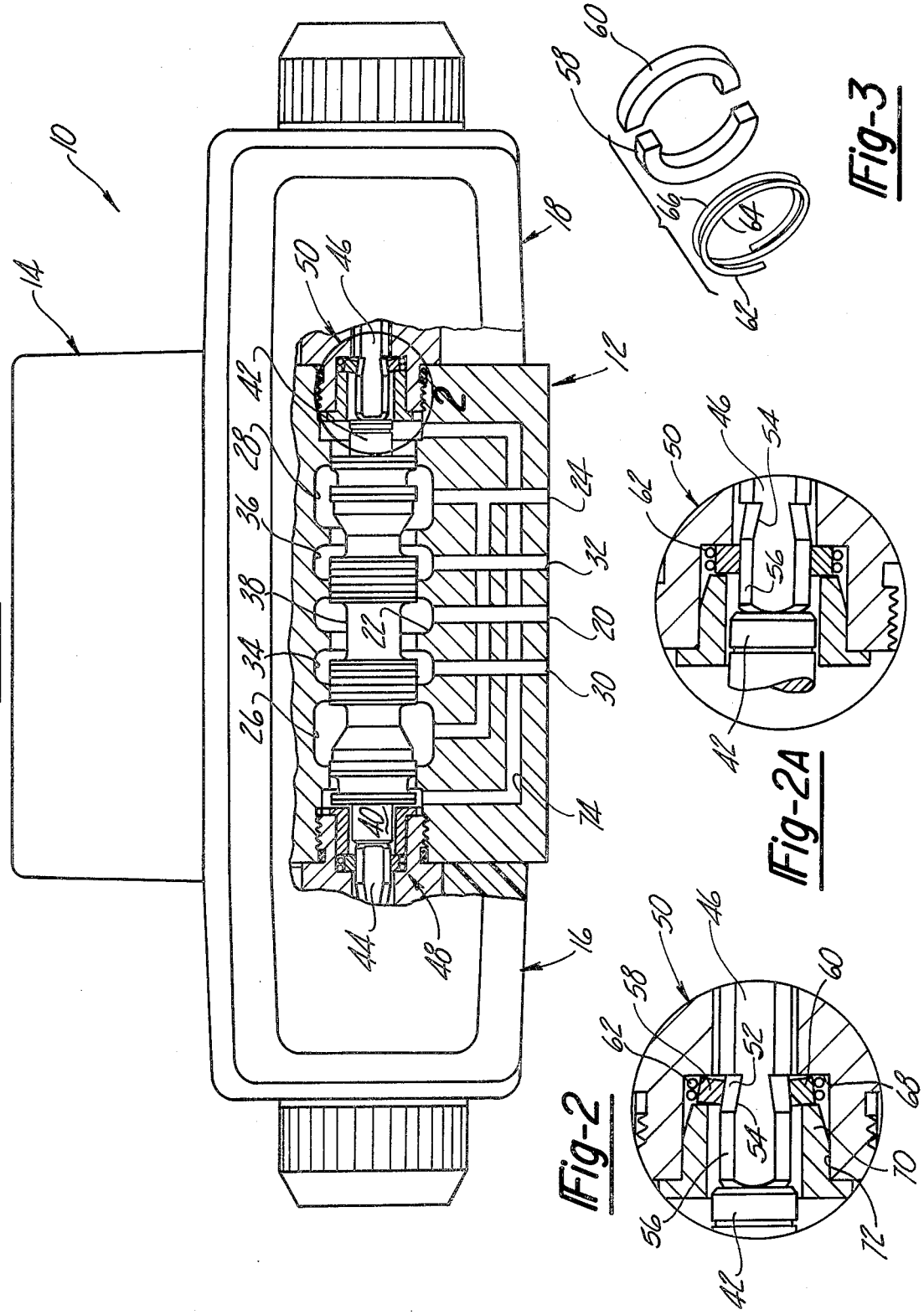

SOLENOID OPERATED DIRECTIONAL VALVE WITH DETENT MECHANISM

TECHNICAL FIELD

The present invention relates to a directional valve which has a spool for movement to a desired position for controlling the direction of flow of hydraulic fluid through the valve, and which has a detent means for restricting movement of the spool after it has been moved to the desired position.

BACKGROUND ART

Hydraulically actuated and solenoid operated directional valves are known in the art. These valves may have detent means that make direct contact either with the spool or with a pin that actuates the spool, and the detent means functions thereby to hold the spool in a selected position.

To provide holding engagement by the detent means a variety of constructions and arrangements have been utilized, as is described in U.S. Pat. No. 4,185,661, patented Jan. 29, 1980 in the names of Gill et al. The cited patent discloses a detent means that is an improvement over earlier prior art apparatus, and there remains a need for further improvements in the art. In the cited patent, the detent means includes a C-shaped spring that partially encircles a pair of split sleeves that are in engagement with the solenoid pin for holding the latter. To assure a uniform disengagement force of the detent means, it is necessary to provide a precision C-shaped spring which may be costly to manufacture. Further, because the C-shaped spring may shift its position in a circumferential direction, that is, by rotating relative to the split sleeves, it is possible that the disengagement force required may vary in an undesirable manner if the gap of the C-shaped spring aligns itself with the parting plane between the split sleeves. Thus, while the detent means of the cited patent has overcome inadequacies of the prior art, improvements from the standpoint of cost and performance in use are still required.

SUMMARY OF THE INVENTION

The present invention has met the need for improvements over the prior art and provides a directional valve with detent means for retaining the spool in a selected position of operation, and wherein the detent means comprises a unique arrangement of a spring used in conjunction with split sleeves. The spring assures uniform performance relative to the magnitude and consistancy of the disengagement force that is desired throughout the life of the directional valve, and the spring has a configuration allowing it to be manufactured more easily and at relatively low cost to achieve these ends. Thus, the present invention incorporates all the features of the improved detent means disclosed in the aforesaid U.S. Pat. No. 4,185,661, and in addition, provides a detent means which can be manufactured at relatively less cost and which will give still greater uniformity of disengagement force in operation.

According to one form of the present invention, a solenoid operated directional valve is provided having a valve body, a spool mounted for axial movement in the valve body, a solenoid mounted on the valve body in axial alignment with the spool, a solenoid pin responsive to said solenoid for movement axially to shift the spool to a selected position, and a detent means mounted against axial displacement relative to the valve body and positioned on the pin for retaining the pin against axial movement when the solenoid has moved the spool and the pin axially to the selected position of the spool. The invention is characterized in that the pin has a groove extending around its circumference shaped to provide a ramp that extends across the groove and is inclined in an axial direction so that it extends to the outer circumference of the pin, the detent means including split detent sleeves of similar shape having inner bearing surfaces for seating on the ramp and for axial sliding movement on the ramp and the outer circumference of the pin, and a coil spring urging said sleeves radially together, said coil spring having two coils wrapped around and seated on the radially outer surfaces of the sleeves so that the thrust exerted radially inwardly on said sleeves will be substantially uniform around the circumference of the spring.

In this form of the invention, a solenoid is utilized to actuate the pin for moving the spool, but it is to be understood that the invention can be practiced by utilizing hydraulic means in place of the solenoid to actuate a similar pin to move the spool. Further, the present invention can also be practiced by mounting the detent means either on the pin directly on the end of the spool.

Thus, it is an object of the present invention to provide improved detent means for use in conjuction with the spool of a directional valve.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a front elevational view partly in section of a solenoid operated directional valve embodying the present invention;

FIG. 2 is an enlarged fragmentary section of the portion of FIG. 1, in the circle 2, wherein the detent means is in one position of operation;

FIG. 2A is an enlarged fragmentary section similar to FIG. 2, but with the detent means in another position of operation; and FIG. 3 is an enlarged perspective view of the spring and split sleeves that are elements of the detent means.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The solenoid operated directional valve 10 has a valve body 12 on which is mounted a junction box 14 and solenoids 16 and 18.

The valve body 12 has a conventional pressure port 20 through which hydraulic fluids can be supplied to the passageway 22, tank port 24 for discharge of hydraulic fluid from the passageways 26 and 28 to tank, and ports 30 and 32 for supplying working fluid under pressure or for returning the working fluid from hydraulically driven apparatus, such as hydraulic cylinders, and the like. For this purpose, the ports 30 and 32 are in communication with the passageways 34 and 36 of the valve body 12. The valve body 12 is in general a conventional construction and other arrangements can be provided for passageways for the hydraulic fluid. Mounted within the valve body 12 is a valve spool 38 which has opposite ends 40 and 42 which are adapted to be engaged at their terminal ends by the solenoid pins 44 and 46 of the solenoids 16 and 18, respectively. In the conventional manner, energizing the solenoid 18 will cause the solenoid pin 46 to move axially to the left so that the spool 38 is moved to the illustrated position in FIG. 1 allowing hydraulic fluid to enter the valve body 12 through the port 20 and to pass through passageways 22 and 34 to port 30. At the same time, return fluid can flow from a work station to port 32, and from there via passageways 36 and 28 to tank port 24.

Detent means 48 and 50 are provided for cooperation in holding the spool 38 in selected positions after the energizing of the solenoids 16 and 18 has occurred. In the form of the invention in FIG. 1, the detent means 50 will hold the solenoid pin 46 in the illustrated position, and thereby, the spool 38 will be retained in this selected position after the solenoid 18 has been deenergized. When it is desired to shift the spool to the opposite position of its stroke, the solenoid 16 will be energized and the solenoid pin 44 will then exert an axial thrust against the spool 38 in an amount sufficient to cause the detent means 50 to open after which the spool and the two solenoid pins 44 and 46 will be shifted axially to the right until such time as the solenoid pin 44 is retained by the detent means 48. Thereafter, solenoid 16 can be deenergized and the spool 38 will be held in the selected position to the right, wherein hydraulic fluid can be supplied from the pressure port 20 to the port 32, and at the same time, hydraulic fluid can be returned via the port 30 for passage to the tank via port 24.

Referring now particularly to FIGS. 2, 2A and 3, the specific details of detent means 50 will be described. As there shown, the solenoid pin 46 has a groove 52 extending around its circumference shaped to provide a ramp 54 that extends across the groove 52 and is inclined in an axial direction and extends to the outer circumference 56 of the solenoid pin. The detent means 50 includes split detent sleeves 58 and 60 which are of similar shape and have inner bearing surfaces for seating on the ramp 54 and for axial sliding movement on the ramp and the outer circumference 56 of the pin 46 to the position shown in FIG. 2A. A coil spring 62 is seated on the outer circumference of the sleeves 58 and 60 urging the sleeves radially together. The coil spring 62 has two coils 64 and 66 that are wrapped around and seated on the radially outer surfaces of the sleeves 58 and 60 so that the thrust exerted radially inwardly on the sleeves will be substantially uniform throughout the circumference of the coil spring.

By virtue of this construction and arrangement of the coil spring 62 and the split sleeves 58 and 60, a detent means is provided wherein a selected disengagement force can be provided, such as a magnitude of 4 pounds, and this disengagement force will remain uniformly the same and will not change during the life of the solenoid operated directional valve. Also, because of the uniform application of the radially inward thrust, the elements of the detent mechanism can shift in a circumferential direction without altering the magnitude of the disengagement force. Still further, by utilizing two complete convolutions of the coil spring, it is found that a spring having the desired characteristics can be manufactured at relative lower cost than previous prior art springs which have been of a C-shape or similar configuration.

For the purpose of maintaining the split sleeves 58 and 60 and the associated coil spring 62 in axially fixed positions relative to the valve body 12, the end wall 68 and the base of the annulus 70 that is fitted in the socket 72 in the solenoid 18, provide a means to confine the split detent sleeves and the coil spring against such axial displacement. These elements also confine the coil spring to its position on the outer circumference of the sleeves as can be seen in FIGS. 2 and 2A.

The present invention is described in connection with a solenoid operated directional valve, but it is to be understood that the invention can also be utilized in connection with larger directional valves wherein hydraulic units are provided in place of the solenoids for actuating pins to move the spool. Also, various arrangements can be provided in the valve body for the passage of hydraulic fluid. Thus, in the illustrated embodiment, a transfer loop 74 is shown for use in connection with cushioning of the spool 38 when displaced axially, and it is to be understood that the present invention can be utilized with other conventional directional valves wherein such cushioning means are not employed.

The detent means 50 is shown mounted on the pin 46, but it may be mounted on the end 42 of the spool 38, but it is preferred to be located on the pin 46.

What is claimed is:

1. A solenoid operated directional valve having a valve body, a spool mounted for axial movement in said valve body, a solenoid mounted on said valve body in axial alignment with said spool, a solenoid pin responsive to said solenoid for movement axially to shift said spool to a selected position, and a detent means mounted against axial displacement relative to said valve body and positioned on said pin for retaining said pin against axial movement when the solenoid has moved said spool and said pin axially to said selected position of said spool, characterized in that said pin has a groove extending around its circumference shaped to provide a ramp that extends across the groove and is inclined in an axial direction and extends to the outer circumference of said pin, said detent means including split detent sleeves of similar shape having inner bearing surfaces for seating on said ramp and for axial sliding movement on said ramp and said outer circumference of said pin, and a coil spring urging said sleeves radially together, said coil spring having two coils wrapped around and seated on the radially outer surfaces of said sleeves so that the thrust exerted radially inwardly on said sleeves will be substantially uniform around the circumference of the coil spring.

2. The solenoid operated valve that is defined in claim 1, characterized in that means confine said split detent sleeves and said coil spring against axial displacement relative to said valve body so that the coil spring cannot be displaced axially off of said sleeves.

3. The solenoid operated valve that is defined in claim 1, wherein a solenoid is mounted on each end of said valve body in axial alignment with said spool, and a solenoid pin is associated with each solenoid, characterized in that each pin has one of said detent means mounted thereon.

4. The solenoid operated valve that is defined in claim 3, characterized in that the ramp of each pin is inclined radially outwardly toward said spool.

5. A directional valve having a valve body provided with passageways for directing flow of hydraulic fluid, a spool member mounted for movement in said valve body and operatively associated with said passageways and movable to selected positions for controlling flow of hydraulic fluid through the passageways, means mounted on said valve body in alignment with said spool member, and a pin member responsive to said means for movement axially to shift said spool member to a selected position, a detent means mounted so as to be confined in a fixed axial position relative to said valve body and positioned on one of said spool and said pin members for retaining said one member against axial movement when said means has moved said members to said selected position of the spool member, said one member having a groove extending around its circumference shaped to provide a ramp that is inclined axially and extends to an adjacent outer circumference to said one member, said detent means including split detent sleeves of similar shape having inner surfaces shaped to allow axial sliding movement against the surfaces of the ramp and the adjacent outer circumference of said one member, and spring means urging said sleeves radially together, characterized in that said spring means is a wrap-around coil-spring seated on the radially outer surfaces of said split detent sleeves, said wrap-around coil-spring having more than one convolution wrapped around said sleeves.

6. The directional valve that is defined in claim 5, characterized in that said one member is said pin member.

7. The directional valve that is defined in claim 5, characterized in that said split detent sleeves have axial cross-sections of rectangular shape and define radially inner cylindrical-shaped bearing surfaces extending substantially the entire axial lengths of the sleeves for axial sliding movement on said ramp and said outer circumference of said one member.

8. The directional valve that is defined in claim 7, characterized in that said wrap-around coil-spring has two convolutions wrapped around said sleeves.

9. The directional valve that is defined in claim 5, characterized in that said wrap-around coil-spring has sufficient convolutions so that the radial inward thrust exerted by the spring on said sleeves is uniform around the circumference of said coil-spring.

* * * * *